United States Patent [19]

Advani et al.

[11] Patent Number: 4,926,459
[45] Date of Patent: May 15, 1990

[54] HEARING ASSIST TELEPHONE

[75] Inventors: Jai K. Advani, Aptos; Robert J. Bernardi, Scotts Valley, both of Calif.

[73] Assignee: Plantronics, Inc., Santa Cruz, Calif.

[21] Appl. No.: 357,540

[22] Filed: May 26, 1989

[51] Int. Cl.⁵ .................. H04M 1/22; H04M 1/60
[52] U.S. Cl. .................. 379/52; 379/375; 379/376; 379/395; 379/396
[58] Field of Search .............. 379/52, 368, 369, 375, 379/376, 395, 396, 434; 40/337; 362/88

[56] References Cited

U.S. PATENT DOCUMENTS

| D. 280,099 | 8/1985 | Topp | 379/52 X |
|---|---|---|---|
| 2,283,098 | 5/1942 | Shann | 379/396 |
| 3,739,105 | 6/1973 | Anson | 379/447 |
| 3,927,282 | 12/1975 | Firstenberg | 379/447 |
| 4,151,376 | 4/1979 | Walker, Jr. | 379/395 |
| 4,160,122 | 7/1979 | Jacobson | 379/395 |
| 4,324,954 | 4/1982 | Taylor | 379/355 |
| 4,349,705 | 9/1982 | Kuhfus | 379/368 X |
| 4,379,210 | 4/1983 | Sparber | 379/376 |
| 4,466,120 | 8/1984 | Walker, Jr. et al. | 379/395 |
| 4,491,692 | 1/1985 | Lee | 379/368 X |
| 4,532,382 | 7/1985 | Pommer, II | 379/355 X |
| 4,578,542 | 3/1986 | Alderman | 379/52 X |
| 4,596,899 | 6/1986 | Wojcik et al. | 379/52 |
| 4,679,231 | 7/1987 | Reichle | 379/376 |
| 4,764,957 | 8/1988 | Angelini et al. | 379/52 |
| 4,773,088 | 9/1988 | Matheny | 379/52 X |

OTHER PUBLICATIONS

Arlev et al., "Electronic Push-Button Telephone with Tone Ringer and Listening-In", *Teleteknik* (Denmark) (Engl. Ed.), vol. 23, No. 1, 1979, pp. 1-18.

Primary Examiner—Keith E. George
Attorney, Agent, or Firm—Arnold, White & Durkee

[57] ABSTRACT

A telephone set adapted for use by hearing impaired and visually impaired persons is disclosed in which the frequency response of audio signals produced from the handset receiver of the telephone is shaped to have enhanced high-frequency characteristics. The telephone is further provided with indicator lights which flash in conjunction with the telephone's electronic ringer to indicate an incoming telephone call. An array of light-emitting diodes is disposed beneath a dialer keypad to facilitate viewing of the dialing buttons in darkened environments. The dialer keypad's buttons are of an enlarged size, so that they may be more easily used by persons with impaired vison or motor skills.

2 Claims, 9 Drawing Sheets

HEARING ASSIST TELEPHONE

FIELD OF THE INVENTION

This invention relates to the field of telephone communications equipment and more particularly relates to a telephone set having features beneficial to elderly and hearing impaired persons.

BACKGROUND OF THE INVENTION

A very wide variety of telephone sets used to initiate and receive telephone calls has been shown in the field of telecommunications. While improvements in the field have introduced significant advances in the design and capabilities of telephone sets, even the simplest telephone, whether electronic or electro-mechanical in nature, must perform several fundamental tasks. Among these basic operations are: requesting use of the telephone system when the handset is lifted or the hook-switch is closed; indicating that the system is ready for use by receiving and reproducing a dial tone; sending the number of the telephone to be called to the system; indicating the status of a call in progress (e.g. "ringing", "busy", etc. . . .) by receiving and reproducing tones indicative of the status; indicating an incoming call by means of a ringer or other audible or visual signal generator; converting the speech of a calling party into electrical signals for transmission to a distant party through the system, and converting electrical signals received from a distant party into acoustical signals; adjusting automatically to variations in the power supplied to it; and signalling the system that a call is finished when a caller "hangs up".

The connection between a calling party and a called party is established by the action of a central switching facility. Each telephone is connected to a central switching station containing signalling equipment and batteries that supply direct current (DC) power to operate the telephone set. In typical systems, each phone is connected to the central switching facility through a local loop of two wires called a wire pair or a "twisted pair". Switches in the switching station respond to dial pulses or dial tones from the telephone to connect the calling phone to the called phone. When the connection is established, the two telephones communicate by means of a current loop using current supplied by the central station's batteries.

With a conventional electro-mechanical telephone, a handset containing a receiver and a microphone rests in a cradle when the phone is not in use. The weight of the handset holds the hook-switch down, leaving the hook-switch open. In this position, called an "on-hook" condition, no current loop is established on the wire pair between the telephone set and the central switching station; however, a ringer circuit in the telephone is always connected to the wire pair from the central office, so that the telephone may detect incoming calls heralded by an AC ringing signal on the phone lines.

When the handset of an electro-mechanical telephone set is removed from its cradle, the spring-loaded hook-switch closes, completing the circuit with the central station. This is called an "off-hook" condition. The central switching station detects the newly established flow of current in the loop and issues a dial tone on the lines to indicate that the calling party can enter a telephone number specifying the called party.

Telephone numbers can be communicated to the central station either in the form of dialing pulses or dialing tones. Dialing pulses are generated by repeatedly opening and closing the hook-switch; dialing tones are generated by an electronic tone generator. The central switching station includes detection circuitry for recognizing dialing pulses or dialing tones, allowing it to automatically establish the connection to the phone specified by the caller. If the called phone handset is "off-hook" when the connection is requested, a busy tone generated by the central station is returned to the calling phone. Otherwise, a ringing signal is sent to the called phone, and a "ringback" tone is returned to the calling phone to indicate that the called phone is ringing.

When the called party removes the handset in response to a ringing signal, the loop to that phone is completed by its closed hook-switch and loop current flows between that phone and the central station. The central office then removes the ringing signal and the ringback tone from the circuit.

The transmitter of a telephone converts the acoustical signals of a caller's speech into variations in the electrical current flowing in the current loop. The receiver of a telephone converts variations in electrical current flowing in the current loop back into acoustical signals audible to a user. A small amount of transmitted signal, called sidetone signal, is fed back into the receiver of the transmitting telephone set; this allows the user to hear his or her own voice in the receiver to determine how loudly to speak.

A telephone call is terminated when either the called or calling party "hangs up" the handset, putting the called or calling telephone in an "on-hook" condition. The central switching station detects the interruption of loop current, and releases the connection.

The aforementioned basic functions are performed by even the simplest telephone sets. It has proven to be desireable to provide telephones having certain advanced features that make them suitable for particular applications or that make the telephone generally easier and more efficient to use. For example, one popular feature to include in telephones is the ability to store frequently dialed telephone numbers in a memory, and retrieve and issue these numbers on command. Such a feature is called memory dialing, and various memory-dialing telephones have been shown in the art. Similar feature is the so-called "emergency dialing" feature, in which emergency numbers can be dialed with a limited number (e.g. one or two) keystrokes. Another popular feature incorporated into telephone sets is a transmit mute function, which enables a user to momentarily prevent sound from being transmitted from the telephone. This feature is similar to the conventional "hold" function often found on commercial-use telephone sets, except that received signals from the called party are still audible from the muted handset.

Often, full-featured telephone sets are partially or completely electronic in design, since features such as memory dialing are best implemented using semiconductor logic devices In electronic telephone sets, operational power for the various electronic components may either be provided from a standard household electrical receptacle, or directly from the batteries provided at a central switching station In the former case, an AC-to-DC transformer is required for converting household AC power into DC power suitable for operating electronic devices. In the latter case, called a line powered unit, no AC-to-DC transformer is needed, since the DC power is available on the incoming wire pair; line powered electronic telephone sets may therefore be less expensive, smaller, and lighter than electronic telephones having an AC-to-DC transformer. In designing electronic telephone sets, however, particular attention must be paid to the power consumption characteristics, in order that they not consume too much power from the central station Low power consumption is particularly desireable during "on-hook" operation.

A further consideration in the design of line-powered electronic telephone sets is that they should be very tolerant of variations in power supplied from the central switching station's batteries, and they should be resistant to voltage surges or spikes which are liable to occur on the wire pair It is an object of the present invention to provide a telephone which is equipped with several of the aforementioned features. In addition, however, it is an object of the present invention to incorporate such advanced features in such a way that results in a telephone that is particularly well-adapted for use by persons with visual and hearing impairments, or by persons wearing hearing aids.

It is still another object of the present invention to provide a full-featured telephone which is line-powered, but which is resistant to noise and voltage surges which may appear on the local loop. A further object of the present invention is to provide a telephone which is capable of storing a plurality of memory-dialing numbers in its memory, and which retains this memory even when the telephone is temporarily disconnected from the telephone lines.

SUMMARY OF THE INVENTION

The foregoing and other objects of the present invention are realized in a line-powered telephone which is capable of memory dialing and emergency (one-touch) dialing in either tone or pulse modes.

The ringer of the disclosed telephone has three user-selectable volume settings; in addition, ringer indicator lights flash in conjunction with the audible ringer in order to provide a visual indication of incoming calls. The ringer utilizes proportionally more of the available energy from incoming ringing signals to produce low-frequency ringing tones than to produce higher-frequency ringing tones, making the ringer more easily heard by persons having reduced sensitivity to higher frequency tones.

The receiver of the disclosed telephone has a user-operated volume control which allows the volume of sound produced by the receiver to be increased for the hard-of-hearing. Furthermore, as the volume is increased, the frequency response characteristics of the sound produced by the receiver is shaped such that high-frequency sounds are amplified slightly more than lower-frequency sounds. The enhanced high frequency response is particularly useful to those persons having reduced sensitivity to high-frequencies.

The keys on the dialing keypad of the disclosed telephone are of a slightly larger than normal size, a feature which is helpful for visually impaired users or those users with reduced fine motor control. Moreover, the keypad is provided with an array of line-powered lights which illuminate the enlarged keys enough for viewing in darkened environments.

BRIEF DESCRIPTION OF THE DRAWINGS

The novel features believed characteristic of a telephone set of the present invention are set forth in the appended claims. The invention itself, however, as well as other features and advantages thereof, will be best understood with reference to a detailed description of a preferred embodiment which follows, when read in conjunction with the following drawings, wherein:

DETAILED DESCRIPTION OF A SPECIFIC EMBODIMENT

Before entering into a detailed description of the circuitry in a telephone in accordance with the present invention, it may be useful to consider an inventory of the primary components in the telephone and a brief overview of the interaction of these components.

Figure 1:
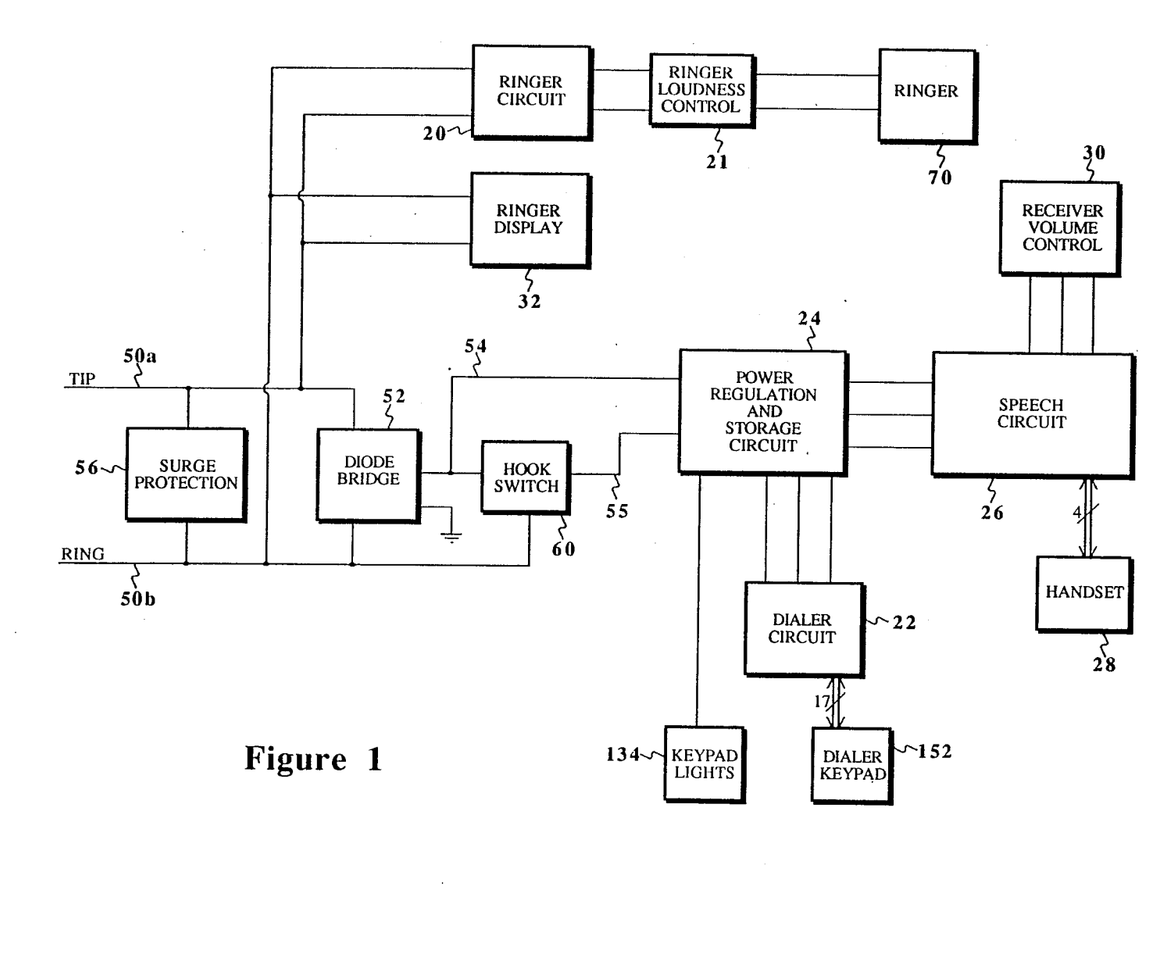
FIG. 1 is a diagram in block form showing the primary functional components in a telephone in accordance with one embodiment of the present invention.

Referring to FIG. 1, a block diagram of a telephone in accordance with the present invention is shown. In conformance with standards in the field of telephony, the telephone of FIG. 1 is interfaced with a central telephone switching station via a "local loop" comprising two wires conventionally referred to as TIP and RING lines. These lines are denoted as 50a and 50b, respectively, in FIG. 1. In accordance with the present invention, a standard two-conductor modular cord may be used to connect the telephone to a standard household single-line jack.

The telephone of FIG. 1 is a complete, line-powered telephone which may be used by itself, or installed in parallel with additional standard, single-line phones. TIP line 50a and RING line 50b perform the dual functions of conducting both analog voice information as well as a direct-current (DC) power signal generated by batteries at a central switching station. The analog voice information is communicated across the loop in the form of speech-frequency variations in the current flowing on TIP line 50a and RING line 50b between the telephone set and the central station. The speech-modulated current is superimposed upon the direct current signal also carried on these lines. In this way, the telephone is capable of operating without additional external power sources, drawing its operational power from the central station's batteries.

As can be seen in FIG. 1, the telephone includes the following functional components:

a diode bridge 52 for rectifying the incoming signal on TIP line 50a and RING line 50b;

a surge protector 56 for preventing other components in the telephone from being exposed to damaging high-voltage transient spikes which may appear on the local loop;

a ringer circuit 20 and a ringer 70, for heralding incoming calls to the telephone of FIG. 1;

a dialer circuit 22 and dialer keypad 152, for allowing a user to initiate outgoing telephone calls from the telephone of FIG. 1;

power storage and power supply components, designated generally as 24 in FIG. 1, for supplying operational power for the telephone; and a speech circuit 26, for performing the necessary analog/voice signal processing in the telephone of FIG. 1.

In accordance with a principal aspect of the present invention, the telephone of FIG. 1 includes three additional components: A volume control circuit 30 allows for user adjustment of the volume of sound emitted from handset 28; an array of lights 134 illuminates the dialing keypad 152; and a ringer display 32 provides a visual indication that the phone is ringing. As will be hereinafter described in greater detail, volume control circuit 30 has a non-linear frequency response characteristic which allows for emphasis of higher-frequency sounds. Finally, the telephone of the present embodiment of the invention has several user control switches, not shown in FIG. 1, which allow a user to select certain modes of operation of the telephone, such as tone or pulse dialing, and transmit muting, memory dialing, emergency "one-touch" dialing, and so on. These features will be described in greater detail below.

The components of the telephone shown in FIG. 1 are contained with in a molded plastic base, not shown. A hearing-aid compatible K-series handset 28 is likewise constructed from molded plastic, and is designed to rest within an appropriately shaped "cradle" formed in the base. In a conventional manner, placing handset 28 in its cradle or removing handset 28 from its cradle actuates a hook-switch 60, discontinuing or establishing communication, respectively, between the telephone and a central station via the local loop.

Figure 2:
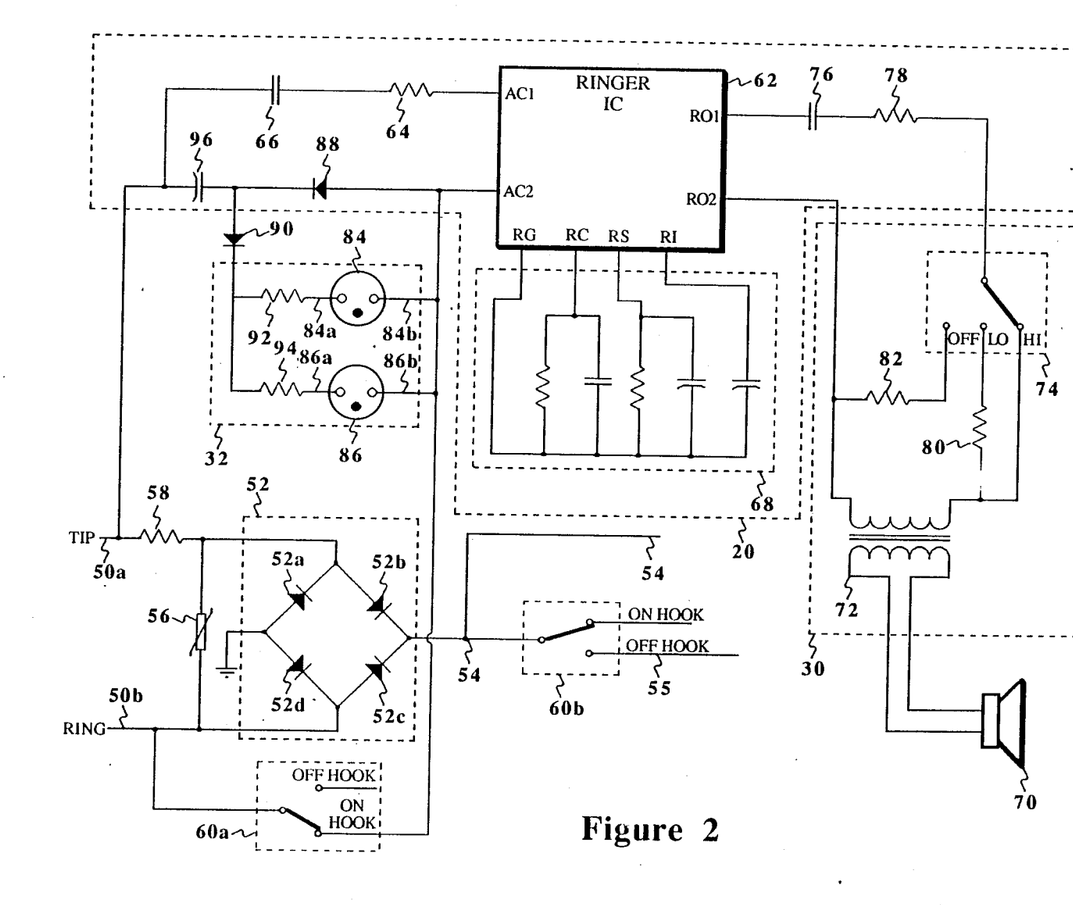
FIG. 2 is a schematic diagram showing a portion of the circuitry including the ringer circuits and diode bridge of the telephone of FIG. 1.

Turning now to FIG. 2, a portion of the circuitry of the telephone of FIG. 1 including diode bridge 52, surge protector 56, hook switch 60, ringer circuit 20, ringer display 32 and ringer 70 is shown in greater detail. Diode bridge 52 comprises diodes 52a, 52b, 52c and 52d, disposed between TIP line 50a and RING line 50b. Diode bridge 52 produces a fixed-polarity, DC signal on an output line 54. In addition, the voice signal comprising variations in loop current are conducted through diode brodge 52 to line 54, eventually to be received at an input to speech circuit 26.

Surge protection device 56, which may be a silicon-controlled rectifier or the like, is also coupled between TIP line 50a and RING line 50b. Surge protector 56 prevents components in the telephone from being exposed to potentiallly destructive high voltage surges appearing on the local loop. When a voltage which exceeds a predetermined threshold occurs between TIP line 50a and RING line 50b, surge protector 56 shorts these two lines together, preventing the voltage surge from damaging delicate electronic components in the telephone. Moreover, the telephone set can be protected from excessive currents in the current loop by means of a fuse 58, which may be a very low impedance metal-film resistor or the like, coupled between TIP line 50a and the inputs to diode bridge 52 and surge protector 56.

Electro-mechanical hook-switch 60 is actuated when the handset of the telephone is removed from or placed into its cradle. When the handset is resting in its cradle, the telephone is said to be "on-hook", and hook-switch 60 is open; conversely, when the handset is not in its cradle, the telephone is "off-hook", and hook-switch 60 is closed. Hook-switch 60 contains multiple two-position switching mechanisms which are actuated simultaneously as a single switch. Two of the individual hook-switch switching mechanisms, designated 60a and 60b, are shown in FIG. 2. Hook-switch 60a functions to selectively couple RING line 50b to the AC2 input of a Ringer integrated circuit (Ringer IC) 62 included in ringer circuit 20. The AC1 input to Ringer IC 62 is coupled to TIP line 50a via resistor 64 and DC blocking capacitor 66.

In conventional wire-pair telephone systems, an incoming telephone call is signalled by an alternating-current (AC) "ringing" signal on TIP line 50a and RING line 50b. When the telephone of the present embodiment is "on-hook", therefore, the AC "ringing" signal is received by ringer inputs AC1 and AC2. When the telephone is "off-hook", however, switch 60a prevents this AC signal from reaching Ringer IC 62.

In one embodiment of the invention, Ringer IC 62 is a commercially-available CSW1A ringer controller or its equivalent. Circuitry denoted collectively as 68 in FIG. 2, coupled to the RG, RC, RS and RI inputs of Ringer IC 62, functions to set the tonal qualities of the ringer output, which is an AC signal driven on Ringer IC outputs RO1 and RO2. In accordance with one aspect of the present invention, circuitry 68 directs more of the available energy from an AC ringing signal into low-frequency ringing tones than into higher-frequency ringing tones. Thus, for a given AC ringing signal, the ringer in accordance with the present invention produces a ringing tone more easily audible to persons with reduced sensitivity to the higher frequencies of the audio spectrum than does a conventional ringer. As a result, recognition of the telephone's ringer is enhanced for older persons, for persons with hearing aids, or for other persons having reduced sensitivity to higher-frequency sounds.

The ringer 70 converts an AC ringing signal on Ringer IC outputs RO1 and RO2 into an audible ringing tone having a emphasis on lower frequencies of the audio spectrum, as previously described. Accordingly, ringer 70 is preferably a standard 8-ohm speaker or the like rather than a piezo-electric receiver transducer, since a speaker is more efficient in producing the desired lower-frequency tones and resonances Ringer 70 is coupled to the ringer IC output via a transformer 72, as shown in FIG. 2. A three-position ringer volume selector switch 74 in ringer loudness control circuit 30 allows a user to select one of three different settings for the loudness of the ringer tone A Ringer IC output line designated RO1 is coupled to the input terminal of ringer volume selector 74 via DC blocking capacitor 76 and resistor 78 In a first position, corresponding to the highest volume setting, switch 74 couples its input directly to transformer 72; in a second postion, corresponding to a lower volume setting, the input of switch 74 is coupled to transformer 72 through an additional resistor 80 which serves to attenuate the transformer-coupled signal, resulting in a ringing tone which is softer relative to that of the higher volume setting. Finally, in a third position corresponding to an "off" setting, switch 74 bypasses transformer 72 altogether, coupling the RO1 terminal of Ringer IC 62 to the RO2 terminal via resistor 82, thus preventing a tone from being generated by ringer 70.

In accordance with another feature of the present invention, the telephone set of FIG. 2 is equipped with a ringer display 32 including lights 84 and 86 which give a visual indication that the phone is ringing. Indicator lights 84 and 86 are preferably neon lamps or the like. During each positive voltage half-cycle of an incoming AC "ringing" signal, current is conducted through hook-switch 60a, diodes 88 and 90, and resistors 92 and 94. The voltage drop across diodes 88 and 90, and resistors 92 and 94 makes the voltage at terminals 84a and 86a of lamps 84 and 86 negative with respect to the terminals 84b and 86b, thus activating indicator lights 84 and 86. During each negative half-cycle of the AC "ringing" signal on RING line 50b, charge stored on capacitor 96 during the positive half-cycle is conducted through diode 90, resistors 92 and 94 to neon lamp terminals 84a and 86a, making the voltage at these nodes positive with respect to nodes 84b and 86b. In this way, the neon lamps are activated continuously during an AC "ringing" signal.

Figure 3:
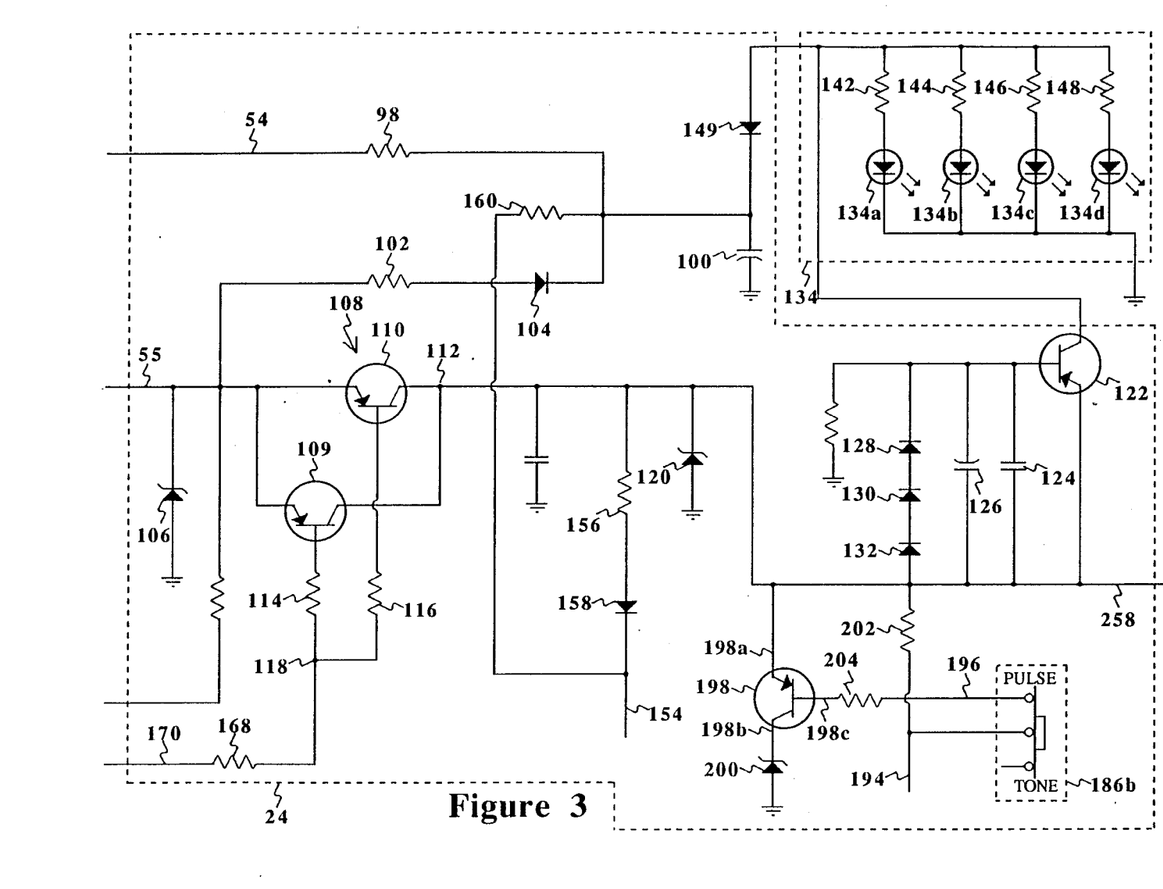
FIG. 3 is a schematic diagram showing the power regulation and storage circuitry in the telephone of FIG. 1.

Turning now to FIG. 3, a schematic diagram of the power regulation and storage circuit 24 and keypad light unit 134 of FIG. 1 is shown. The fixed-polarity output 54 of diode bridge 52 is conducted through resistor 98 and is received at the positive terminal of capacitor 100. In accordance with a further aspect of the present invention, capacitor 100 stores electrical energy supplied on TIP line 50a and RING line 50b, the stored energy being used to supply a limited amount of operational power to the telephone during "on-hook" periods. In particular, capacitor 100 supplies operational power to the dialing circuitry, as shall be hereinafter described, so that volatile memory facilities therein can retain their contents when the phone is "on-hook".

Referring briefly to FIG. 2, when the telephone handset is taken "off-hook", hook-switch 60b is closed, providing the fixed-polarity output of diode-bridge 52 on line 55. Returning to FIG. 3, line 55 is also coupled to the positive terminal of capacitor 100, via resistor 102 and diode 104. Zener diode 106 limits the voltage on line 55 to less than 110-volts. Line 55 is further coupled to the emitter terminals of bipolar pnp transistors. The collector terminals of transistors 108 and 110 are combined at node 112, and the base terminals of transistors 108 and 110 are combined, via resistors 114 and 116, respectively, at node 118. Thus, when hook-switch 60b is closed, the fixed polarity DC signal on line 55 activates transistors 108 and 110, providing current to be generated at nodes 112 and 118. Zener diode limits the voltage at node 112 to less than 15-volts.

Another feature of a telephone in accordance with the present invention is the provision of an enlarged dialing keypad which is illuminated facilitate reading and dialing. Whereas conventional dialing keypads may measure four square inches in area, the dialing keypad in a telephone in accordance with the present embodiment may be up to four times as large (sixteen square inches). As may be appreciated by one of ordinary skill in the art of telephone design, a consistent and highly efficient illumination circuit is necessary to sufficiently illuminate such an enlarged keypad in a line-powered telephone. One such circuit, including capacitors 124 and 126, diodes 128, 130 and 132, and bipolar pnp transistor 122, is illustrated in FIG. 3. Node 112 in FIG. 3 is coupled to the emitter terminal transistor 122. The emitter and base terminals of transistor 122 are connected via the parallel combination of capacitors 124 and 126, as well as by the series combination of diodes 128, 130 and 132. The voltage drop across these diodes holds the voltage at the base terminal of transistor 122 approximately 2.1-volts below the voltage at the emitter terminal of transistor 122, turning transistor 122 on and supplying current from its collector terminal. This current is conducted to light-emitting diode (LED) array 134, which includes high-efficiency LEDs 134a, 134b, 134c, and 134d. Collector current from transistor 122 is conducted to the LEDs via resistors 142, 144, 146, and 148, respectively. The LEDs are disposed near or underneath the translucent buttons of a dialer keypad 152, not shown in FIG. 3. When the handset is taken "off-hook", LEDs 134a, 134b, 134c, and 134d are activated, illuminating the dialer keypad 152 sufficiently for viewing the keys in a darkened room. Excess current supplied from transistor 122 that is not used by the LED array 134 is provided to the positive terminal of capacitor 100 via diode 149, which diode prevents energy stored on capacitor 100 from being discharged through LED array 134.

Figure 4:
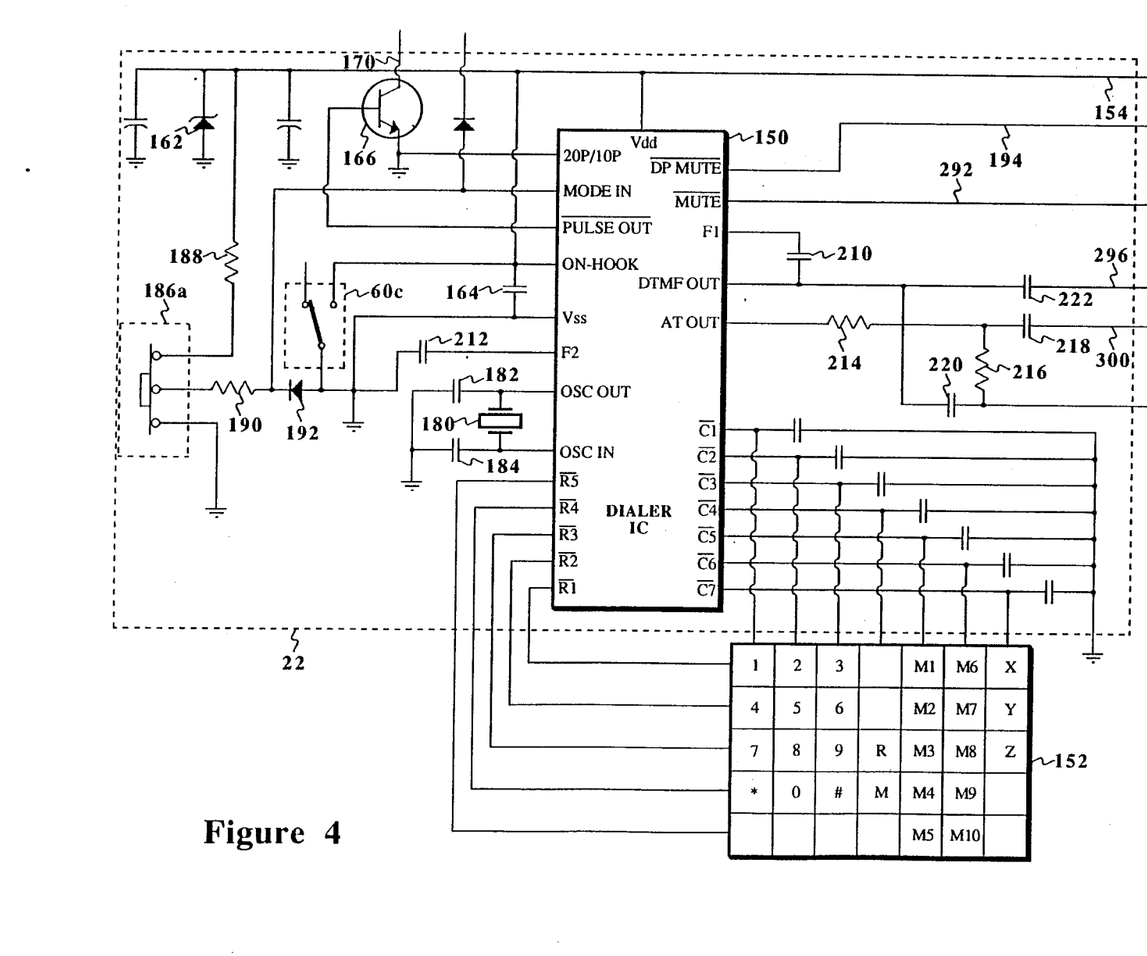
FIG. 4 is a schematic diagram showing the dialing circuits in the telephone of FIG. 1.

Turning now to FIG. 4, dialer circuit 22 and dialer keypad 152 from FIG. 1 are shown in greater detail. Much of dialer circuit 22 is implemented in the form of a special-purpose integrated circuit 150. In one embodiment of the invention, Dialer IC 150 is a commercially-available device, such as a BU8322 20-Number Tone/-Pulse Repertory Dialer manufactured and sold by Rohm Corporation of Irvine, Calif. In accordance with a primary object of the present invention, dialer keypad 152 includes up to thirty-five buttons, each of an enlarged size so as to be more easily used by the elderly or by persons with impaired motor skills. In particular, the buttons in keypad 152 have nominal dimensions of 14-millimeters by 20-millimeters, the keypad array having a substantially greater overall area than conventional keypads, as previously noted. Keypad 152 has alphanumeric buttons "0" through "9", "*" and "#", as well as "R" and "M" buttons for dialing sequence memory recall and storage, respectively, three "one-touch dialing" buttons "X", "Y", and "Z", and ten "memory dialing" buttons "M1" through "M10". The "5" button is provided with a Braille-type raised dot at its center to assist visually impaired persons in using keypad 152.

Dialer IC 150 receives operational power at its Vdd input from line 154. Referring momentarily to FIG. 3, line 154 is receives current from the output node 112 of transistor 110 via the path of resistor 156 and diode 158, and is additionally coupled to the positive terminal of capacitor 100, via resistor 160. Thus, line 154 receives "off-hook" power supplied by transistor 110, and receives "on-hook" power from capacitor 100. In this way, Dialer IC 150 is provided with an uninterrupted power source, regardless of whether the handset is "on-hook" or "off-hook". Returning to FIG. 4, zener diode 162 limits the voltage on line 154 to approximately 4-volts.

Line 154 is also coupled to the ON-HOOK input of Dialer IC 150. A high-level signal at the ON-HOOK input indicates to Dialer IC 150 that the telephone handset is "on-hook", while a low-level signal at the ON-HOOK input indicates that the handset is "off-hook". The ON-HOOK input of IC 150 is also selectively coupled to ground, via one of the multiple hook-switch switching mechanisms, 60c; in addition, capacitor 164 is coupled between line 154 and the Vss input of IC 150. When the telephone is "on-hook", switch 60c is open, isolating the ON-HOOK input of IC 150 from ground; current supplied from line 154 charges capacitor 164, maintaining a high-level signal at the ON-HOOK input to IC 150, and thus indicating that the handset is "on-hook". On the other hand, when the handset is "off-hook", switch 60c is closed, coupling the ON-HOOK input to ground and discharging capacitor 164. This creates a low-level signal at the ON-HOOK input which indicates that the handset is "off-hook".

As shown in FIG. 4, a crystal oscillator 180 with feedback capacitors 182 and 184 are coupled to the OSC OUT and OSC IN terminals of IC 150. Crystal oscillator 180 provides a reference frequency used by IC 150 in generating standard dual-tone multifrequency (DTMF) dialing tones.

Dialer IC 150 receives inputs from dialer keypad 152 at input terminals labelled R1 through R5 and C1 through C7. Each of the buttons in keypad 152 is identified by a unique combination of row and column signals received at inputs R1 through R5 and C1 through C7. Dialer keypad 152 is preferably a matrix-type telephone keypad which produces valid key inputs to Dialer IC 150 by short-circuiting row terminal (R1 through R5) of IC 150 with a column terminal (C1 through C7), or by simultaneously driving both terminals low. When a valid key input is produced, IC 150 responds by performing the indicated function.

In the case of numeric inputs, IC 150 either generates the corresponding dialing tone on its DTMF OUT output terminal, or generates the corresponding dialing pulse sequence on its PULSE OUT output terminal. Other sequences of keypad inputs involving the memory storage and recall keys (M1–M10, X, Y, Z, R, and M) allow the user to store entire dialing sequences in the dialer IC's memory, or to recall these sequences from memory and execute them. In addition to performing the designated functions, Dialer IC 150 also responds to each valid key input it receives by generating a 926-Hz, 30-millisecond square-wave tone on its audio-tone (AT) output terminal. This output signal may be used to provide the user with a "confidence tone", positively confirming each valid key input with an audible tone on the receiver.

The MODE IN input of IC 150 determines whether IC 150 generates DTMF dialing tones or conventional dialing pulses in order to initiate outgoing telephone calls. When the signal received at the MODE IN input terminal has a high level, IC 150 operates in pulse-dialing mode, generating dialing pulses on its PULSE OUT output pin. Conversely, when the signal at the MODE IN input has a low level, IC 150 generates operates in tone-dialing mode, generating DTMF tones on its DTMF OUT output terminal. A user-actuated mode-select switch, denoted as 186a in FIG. 4 sets the level of the MODE IN input, and thus allows a user to select either tone-dialing or pulse-dialing. In a first position, switch 186a couples line 154 to the MODE IN input, via resistors 188 and 190. The high-level signal from line 154 indicates to IC 150 that the user has selected the pulse-dialing mode. When switch 186a is in a second position, however, the MODE IN input of IC 150 is coupled to ground, via resistor 190. This keeps the MODE IN input to 150 at a low level, indicating the selection of tone-dialing mode.

A MUTE output terminal of IC 150 is used to prevent loud dialing signals (either tone or pulse dialing) from being amplified by the receiver in the dialing phone. The MUTE output has a low level whenever IC 150 is issuing dialing signals, and is in a high-impedance state otherwise. Likewise, a DP MUTE output terminal of IC 150 can be used in preventing only dialing pulses from being amplified by the receiver. Dialing pulses are conventionally generated by repeatedly opening and closing ("making" and "breaking") the local loop, or by otherwise causing steep voltage transients or spikes on the loop. Such dialing pulses may be of such a magnitude as to be unpleasant to hear on the receiver. The DP MUTE output signal has a low level whenever pulse-dialing sequences are being issued, and is in a high-impedance state otherwise. With both the MUTE and DP MUTE output signals available, a telephone using the BU8322 Dialer chip can allow only DTMF tones to be heard over the receiver while preventing dialing pulses from being heard, or prevent both tone and pulse dialing sequences from being heard.

The DP MUTE output signal is conducted from IC 150 via line 194. Returning to FIG. 3, line 194 is received at one terminal of user-actuated mode control switch 186b. Switch 186b is part of a dual two-position switch including mode switch 186a previously described with reference to FIG. 4. Independent switching mechanisms 186a and 186b are actuated simultaneously by the user as if they were a single switch. As shown in FIG. 3, when the dialing pulse mode has been selected, switch 186b couples line 194 to line 196. The emitter terminal 198a of pnp transistor 198 is coupled to node 112 and receives power from line 55 when the phone is "off-hook"; the collecter terminal 198b of transistor 198 is coupled to ground via zener diode 200, which serves to limit the voltage at the collector terminal 198b to less than 3-Volts or so. The base terminal is coupled, via resistor 204, to line 196. Line 194 is also coupled, via resistor 202, to node 112.

When the phone is "on-hook", no current is provided on line 55, and consequently no current is produced at node 112. Transistor 198 is not activated, since no signal is present at its emitter node 198a. The DP MUTE output of IC 150 is in a high-impedance state during "on-hook" periods. When the phone is taken "off hook", power is supplied from node 112, turning transistor 198 on. With switch 186b in the "pulse" position, current emitted from the base terminal 198c of transistor 198 is conducted through resistors 204 and 202, providing an additional contribution of power to node 112. This ensures activation of keypad LED array 134. During pulse dialing, however, the DP MUTE terminal of IC 150 is goes low, pulling line 194 low. Node 112 is thus pulled low, LED array 134 is deactivated, and transistor 198 is turned off. Once pulse dialing is over, the DP MUTE terminal returns to its high-impedance state, and LED array 134 and transistor 198 are turned on.

On the other hand, when switch 186b is in the "tone" position, transitor 198 is effectively isolated from the circuit. Since DP MUTE is in a high-impedance state whenever the telephone is in tone dialing mode, line 194 has no effect on the level of node 112; LED array 134 remains lighted during tone dialing.

The base terminal of transistor 166 is coupled to the PULSE OUT output terminal of IC 150. During the "make" portions of each pulse dialing sequence, when the PULSE OUT signal is at a high level, transistor 166 is turned on, its emitter current being supplied from line 170, which provides off-hook power from node 118 (see FIG. 3) via resistor 168. The emitter terminal of transistor 166 is coupled to the 20P/10P input of IC 150. When the 20P/10P input is high, IC 150 generates dialing pulses at a rate of 20 pulses per second; when low, IC 150 generates 10 dialing pulses per second.

Figure 5:
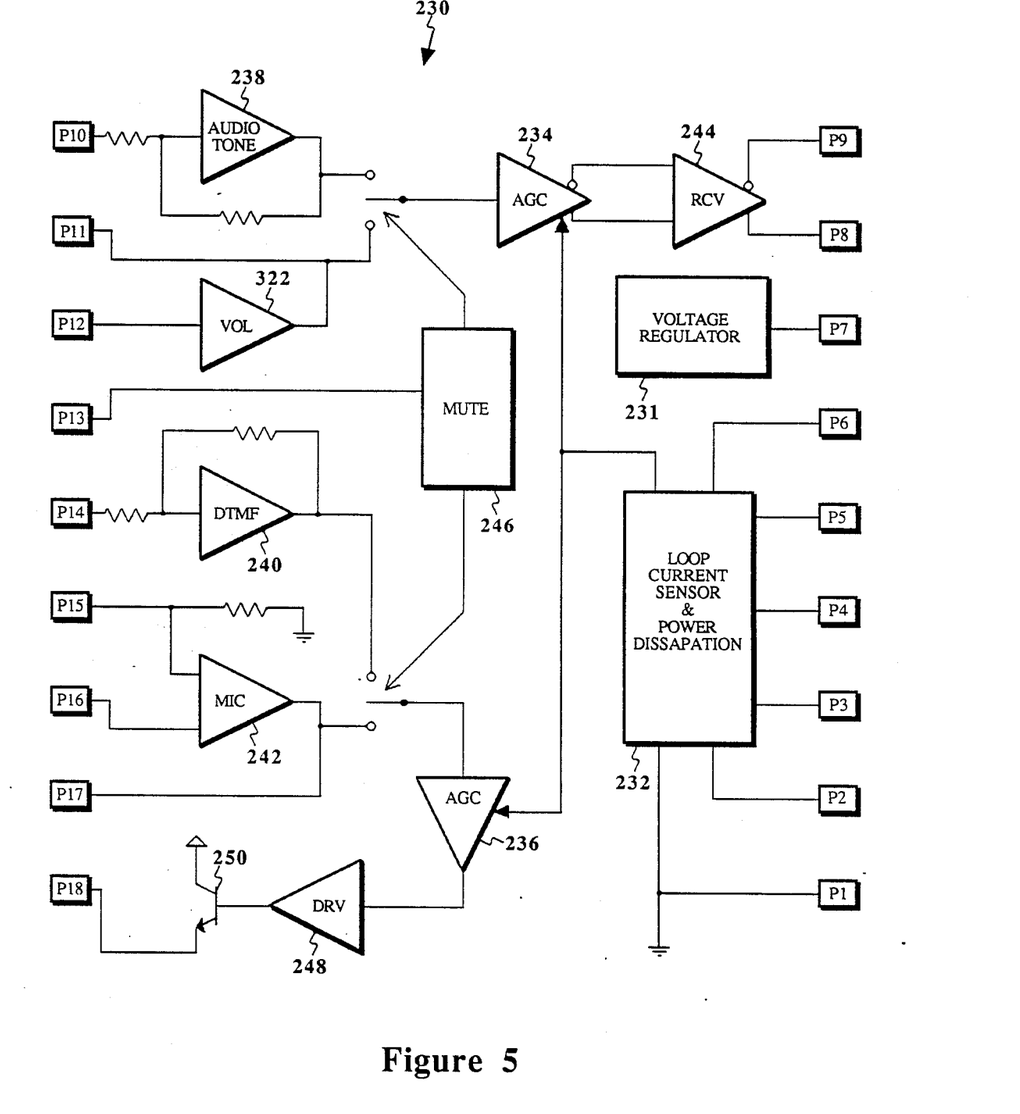
FIG. 5 is a diagram in block form of the integrated voice circuit in the telephone of FIG. 1.

Terminals F1 and F2 of IC 150 are provided to allow for phase compensation capacitors 210 and 212 to be introduced into DTMF output circuit. Additional filtering and compensation of the DTMF and AT outputs of IC 150 is performed by circuitry including resistors 214 and 216 and capacitors 218, 220, and 222. This circuitry is included in accordance with the manufacturer's data sheet for the BU8322 device, which is incorporated herein by reference. The manufacturer's data sheet for the BU8322 also includes details of the memory dialing, automatic redialing, and emergency ("one-touch") dialing capabilities of this device. These functions are performed using the special function keys of keypad 152. The special features such as emergency dialing, in which depressing only a single key ("X", "Y", or "Z") on keypad 152 initiates a complete dialing sequence, make the BU8322 particularly well-suited to the telephone of the present invention In conventional telephone networks, two-wire local loop circuits are used for the connection between a telephone and a central switching station, since such circuits are cheaper and easier to establish. Four-wire circuits having two wires for transmitter signals and two wires for receiver signals are used in most other portions of a telephone network. In a telephone, separation or decoupling of the transmit and receive circuits is necessary so that separate transmit and receive amplifiers can be employed. Various manufacturers market integrated circuits which perform these speech circuit interfacing and decoupling functions. In one embodiment of the present invention, a BA6566 Integrated Speech Circuit manufactured by Rohm Corporation of Irvine, Calif. is used. A block diagram showing the main functional elements of a BA6566 IC is shown in FIG. 5. IC 230 is a standard, 18-pin dual in-line parallel (DIP) chip, the input/output pins designated as P1 through P18 in FIG. 5.

Pin P1 provides a ground-level connection for IC 230. Positive voltage supply for IC 230 is provided through the line voltage (VL) input terminal P4. The input signal on this line comprises the incoming voice signal superimposed upon a DC power supply voltage, both provided to IC 230 from the local loop comprising TIP line 50a and RING line 50b. A regulated positive power supply output is provided from the Vcc output terminal P7 of IC 230; this output may be used to provide a regulated power supply signal to other circuitry within the telephone. Voltage regulator circuitry designated as 231 in FIG. 5 derives the regulated voltage from the line voltage on terminal P4.

An ACG terminal of IC 230 designated as P6 receives an automatic gain control (AGC) input signal. The logical level of the AGC input signal determines whether or note the AGC feature of IC 230 is enabled.

Terminals P1 through P6 are received in the functional block designated as the Loop Current Sensor/Power Dissapation element 232. When AGC is activated, as indicated by coupling AGC input P6 to ground, Loop Current Sensor 232 automatically adjusts the gain of two AGC amplifier stages designated as 234 and 236 in FIG. 5. Element 232 also performs the impedance matching between the local loop and the telephone circuits, using external balancing impedances coupled to the RL and CL terminals P2 and P3 of IC 230.

Audio-frequency tones, such as the "confidence tones" generated from the AT output of dialer 130, are received at the AT input terminal P10 of IC 230. Audio tones are amplified in AT amplifier 238. DTMF dialing tones from IC 130 are received on the MF input terminal P14 of IC 230, and are then amplified by MF amplifier 240. As will be hereinafter shown in greater detail, a telephone handset microphone is coupled to the TI1 and TI2 input terminals (P16 and P15, respectively) of IC 230. Microphone signals are then amplified in mic amplifier 242. Terminal P17 is designated as TC in FIG. 5; this terminal is provided so that a feedback loop can be established to control the gain of the mic amplifier 242 depending upon the type of microphone transducer used in the handset.

A telephone handset receiver is coupled to the receiver output lines RO1 and RO2 (pins P8 and P9, respectively) of IC 230. The receiver output signal is produced by receiver amplifier 244, which in turn receives its input from gain-controlled amplifier 234. The volume level of the receiver signal produced at the receiver terminals RO1 and RO2 is determined by the impedance coupled between the RC and RI terminals (P11 and P12) of IC 230.

A mute control input terminal P13 designated as MUTE in FIG. 5 receives a digital logic mute control signal which is conducted to mute circuit 246 in IC 230. A low-level input to P13 indicates that muting is enabled, causing mute circuitry 244 to disable the inputs to AGC amplifiers 234 and 236. In this way, a low-level MUTE input prevents signals from being transmitted or received.

Gain-controlled amplifier 236 feeds an output driver amplifier, the output of which is interfaced to the transmit output (TO) terminal P18 via bipolar transistor 250. As will be shown with reference to FIG. 6, the TO terminal is the output of voice IC 230 that is presented to the local loop for transmission to the central station.

Additional details of the operation and use of the Rohm BA6566 voice IC can be obtained with reference to the manufacturer's specifications/data sheet for this device, which is incorporated herein by reference.

Figure 6:
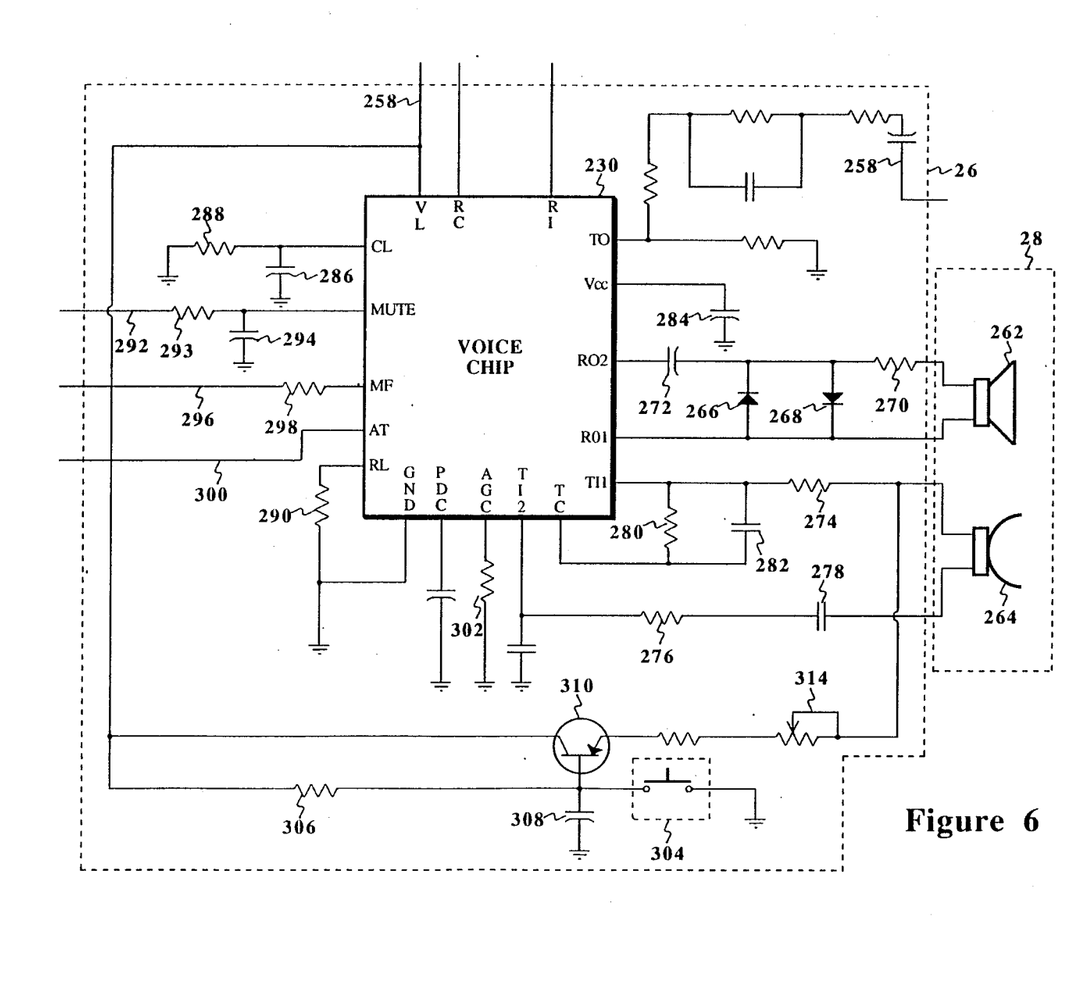
FIG. 6 is a schematic diagram of the speech circuits in the telephone of FIG. 1.

Referring now to FIG. 6, a schematic diagram of speech circuit 26 from the telephone of Figure 1 is shown, including a BA6566 integrated speech circuit (designated as 230). The local loop signal is provided to IC 230 at its VL input. In particular, with reference to FIGS. 2 and 3, recall that the local loop signal appears on line 55 when the phone is taken "off-hook", closing switch 60b. This signal is propagated through transistors 109 and 110 to node 112. Line 258 carries the local loop signal from node 112 to the VL input of IC 230.

Telephone handset 28 includes a receiver 262 and a microphone 264. Receiver 262 is coupled, as previously noted, to the RO1 and RO2 inputs of voice IC 230; microphone 264 is coupled to the TI1, TI2, and TC inputs of IC 230. Diodes 266 and 268 prevent overdriving of receiver 262, while resistor 270 and capacitor 272 serve to match the impedance of receiver 262 to that of receiver amplifer 244 (see FIG. 5). Similarly, resistors 274 and 276 and capacitors 278 and 279 match the impedance of the microphone 264 to mic amplifier 242 shown in FIG. 5. Resistor 280 and capacitor 282 comprise a feedback loop for mic amplifier 242, allowing the gain of that amp to be determined according to the type of microphone 264.

A capacitor 284 coupled to the Vcc input of IC 230 assists voltage regulator 231 in providing a regulated voltage to the various components of IC 230, even when the incoming line voltage from line 258 at the VL terminal occasionally drops low.

As previously noted with reference to FIG. 5, a capacitor 286 and resistors 288 and 290 coupled to the CL and RL terminals of IC 230 provide the balancing impedances necessary for voice IC 230 to match the impedance of the two-wire TIP/RING circuit to that of the telephone.

Recall from FIG. 4 that a mute control signal for preventing dialing tones and/or pulses from being heard on the dialing phone's receiver is produced from the MUTE output of dialer IC 150. The mute control signal is conducted from IC 150 on line 292 and coupled to the MUTE input of voice IC 230 via resistor 293. Capacitor 294 prevents AC signals from affecting this input. DTMF dialing tones generated by dialer IC 150 are conducted on line 296 through resistor 298 and received at the MF input to IC 230. Audio-frequency tones generated by dialer IC 150 are conducted along line 300 and received at the AT input terminal of IC 230. Automatic gain control in IC 230 is enabled by coupling the AGC input of IC 230 to ground via resistor 302.

A user-actuated mute control switch 304 allows a user to momentarily prevent voice signals from being transmitted on the local loop. A first terminal of switch 304 is coupled to ground. A second terminal of switch 304 is coupled via resistor 306 to line 258, which carries the local loop signal to IC 230. The second terminal is also coupled to ground, via capacitor 308, and to the base terminal of transistor 310. The emitter terminal of transistor 310 is coupled, via resistor 312 and variable resistor 314, to one terminal of handset microphone 264. The collector terminal of transistor 310 is coupled to line 258.

Transistor 310 and resistors 312 and 314 establish a connection for allowing a fraction of the voice signal produced by handset microphone 264 to be applied to the VL line input of voice chip 230. This is referred to as a "sidetone" signal. Sidetone is necessary so that a person speaking into microphone 264 can hear his/her voice in receiver 262 and thus determine how loudly to speak. The level of the sidetone signal is important, since too much sidetone will cause the speaker to talk to softly for proper reception by the called party, and too little sidetone will cause the speaker to talk to loudly. Accordingly, variable resistor 314 can be adjusted in order to set the sidetone signal at an appropriate level.

Transistor 310 generates the sidetone signal by producing current from its collector terminal that is proportional to the signal received at its emitter terminal. Current through resistor 306 from line 258 charges capacitor 308, thus limiting the voltage differential between the emitter and base terminals of transistor 310. This prevents transistor 310 from turning on too hard, producing an excessive sidetone signal.

When mute switch 304 is depressed, however, the base terminal of transistor 310 becomes grounded. A much larger fraction of the signal from microphone 264 is drawn by transistor 310, greatly attenuating the input to mic amplifier 242 in IC 230. In this manner, the user can mute the transmission from the telephone.

Recall from FIG. 5 that an impedance coupled between the RC and RI terminals (P11 and P12, respectively) of IC 230 determines the receiver volume. In accordance with a primary feature of the present invention, the volume control impedance coupled between the RC and RI terminals is also used to shape the frequency response characteristics of the receiver signal. A schematic diagram of receiver volume control circuitry 30 in accordance with one embodiment of the invention is shown in FIG. 7.

Figure 7:
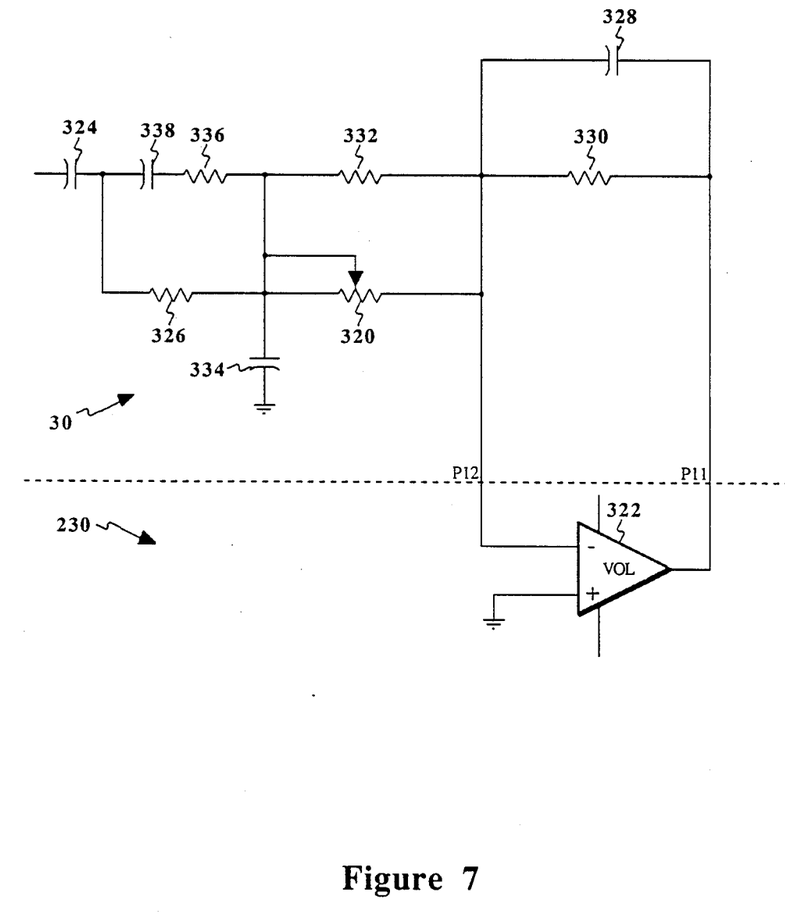
FIG. 7 is a schematic diagram of the volume control circuitry in the telephone of FIG. 1.

With reference to FIG. 7, receiver volume control circuit 30 generally employs an inverting operational-amplifier (op-amp) arrangement with variable gain which is controlled via a variable resistor (potentiometer) 320. The op-amp used by volume control circuit 30 is the volume control op-amp 322 incorporated into voice IC 230. As previously shown in FIG. 5, the inverting input of op-amp 322 is accessible on the P12 terminal of IC 230, and the output of op-amp 322 is accessible on the P11 terminal of IC 230.

Capacitor 324 and resistor 326 act as a filter to roll-off the low frequency response of the receiver output at approximately 100-Hz. Capacitor 328 and resistor 330 roll-off the high frequency response of the receiver output beginning at about 4-kHz.

The parallel combination of potentiometer 320 and resistor 332 is coupled between the inverting input of op-amp 322 and resistor 326. When potentiometer 320 is set to a high resistance, on the order of 300-kΩ or so, it dominates the input impedance of op-amp 322, resulting in a minimum gain with a nearly flat frequency response with a slight high-frequency peak. This residual high-frequency peak is flattened by capacitor 334, which is effective when potentiometer 320 has a high resistance. When potentiometer 320 is adjusted to have a low resistance, capacitor 334 effectively couples the inverting input of op-amp 322 to ground, and thus has little effect on volume control circuit 30.

With continued reference to FIG. 7, the network comprising resistor 336 and capacitor 338 shunts resistor 326 and produces a high-frequency boost of the frequency response at high gains. Resistor 336 and capacitor 338 have little effect on volume control circuit 30 at low gains, (when potentiometer 320 is adjusted to maximum resistance), because the resistance of potentiometer dominates the impedance into the inverting input of op-amp 322. Potentiometer 320 preferably has a logarithmic characteristic, since the effect on gain and high-frequency response is greatest at the lower potentiometer resistances.

Figure 8:
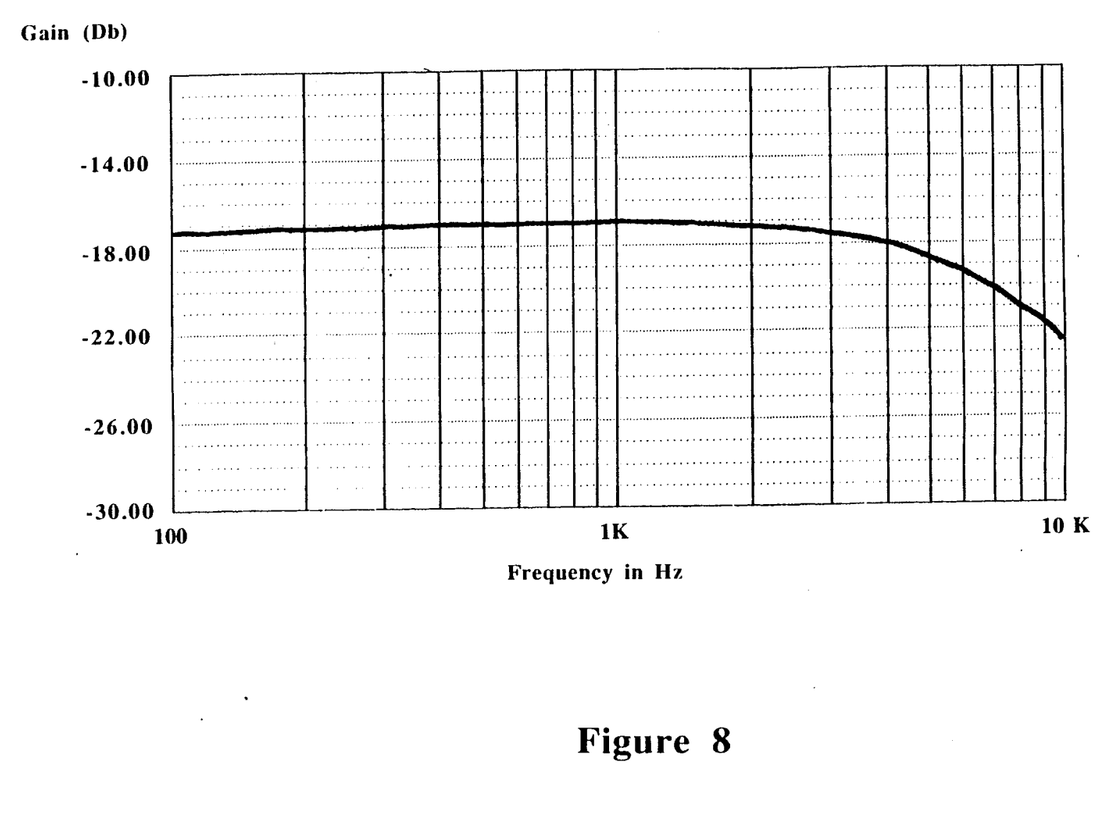
FIG. 8 is a graph of a frequency response curve for the receiver in the telephone of FIG. 1.

In FIG. 8, a graph of the frequency response of the receiver output with potentiometer 320 set at maximum resistance is shown. This graph corresponds to a minimum gain from op-amp 322. Notice that high-frequency roll-off begins at approximately 4-kHz.

Figure 9:
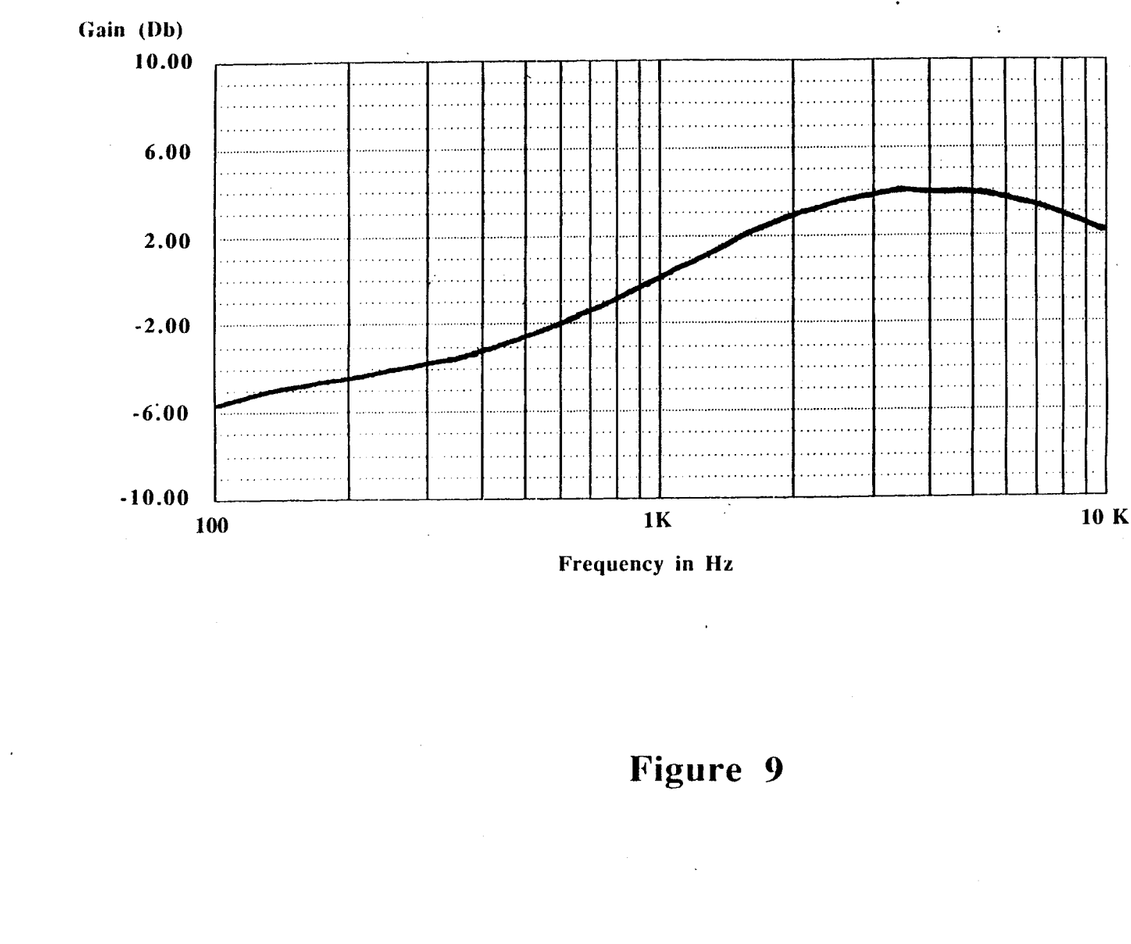
FIG. 9 is a graph of a frequency response curve for the receiver in the telephone of FIG. 1.

In FIG. 9, a graph of the frequency response of the receiver output with potentiometer 320 set a a minimum resistance is shown. This graph corresponds to a maximum gain from op-amp 322. Beginning at around 1-kHz or so the frequency response slopes upward, reaching a maximum level at approximately 4-kHz. Through a comparison of the graphs of FIGS. 8 and 9, it should be apparent that as the receiver volume control (potentiometer 320) is turned up, the high-frequency components of the receiver signal are boosted slightly. This characteristic is of particular benefit to persons having the common form of hearing impairment in which high frequency sensitivity is reduced.

From the above detailed description of a specific embodiment of the present invention, it should be evident that a telephone has been disclosed which incorporates a number of features that make the telephone particularly well suited for individuals having slightly impaired vision, hearing, and/or motor skills. While a specific embodiment of the invention has been described in detail, it is to be understood that various changes, alterations and substitutions can be made therein without departing from the spirit and scope of the invention as defined in the appended claims which follow.

In particular, with reference to the various commercially-available devices utilized in the disclosed telephone, it should be noted that various manufacturers market similar devices which may be entirely suitable for use in conjunction with the present invention; the recitation herein of particular devices has been solely for the purposes of illustration.

What is claimed is:

1. A telephone set, for communicating via a standard local loop telephone network, comprising:
   a receiver amplifier;
   a receiver converting an electrical receiver signal received from the receiver amplifier into an audible acoustical signal,
   a receiver volume control providing adjustment of the gain and frequency response characteristic of the receiver amplifier, such that with the volume control at a first setting, the gain of the receiver amplifier is at a minimum, and the frequency response of the amplifier is substantially uniform throughout the audio spectrum, and such that with the volume control at a second setting, the gain of the receiver amplifier is at a maximum, and the frequency response of the amplifier is emphasized at the higher frequencies of the audio spectrum;
   a visual indicator of incoming calls;
   an electronic ringer producing an audible signal to herald incoming calls, the frequency response of said ringer emphasizing the lower frequencies of the audio spectrum; and
   an illuminated, large-key dialing keypad.

2. A line-powered telephone set, for communicating via a standard local loop telephone network, comprising:
   a receiver amplifier;
   a receiver converting an electrical receiver signal received from the receiver amplifier into an audible acoustical signal,
   a receiver volume control providing adjustment of the gain and frequency response characteristic of the receiver amplifier, such that with the volume control at a first setting, the gain of the receiver amplifier is at a minimum, and the frequency response of the amplifier is substantially uniform throughout the audio spectrum, and such that with the volume control at a second setting, the gain of the receiver amplifier is at a maximum, and the frequency response of the amplifier is emphasized at the higher frequencies of the audio spectrum;
   a visual indicator of incoming calls;
   an electronic ringer producing an audible signal to herald incoming calls, the frequency response of said ringer emphasizing the lower frequencies of the audio spectrum, said electronic ringer having a plurality of selectable volume level settings;
   an illuminated, large-key dialing keypad; and
   a line-powered memory dialing circuit providing storage for a plurality of dialing sequences, the dialing circuit responsive to dialing keypad inputs to store dialing sequences, and selectively retrieve and issue the stored dialing sequences.

* * * * *